US008781497B2

(12) United States Patent
Degtyar et al.

(10) Patent No.: US 8,781,497 B2
(45) Date of Patent: Jul. 15, 2014

(54) PASSIVE LOCATING OF UMTS HANDSETS

(75) Inventors: Ilya Degtyar, Rishon Lezion (IL); Alon Shechter, Herzeliya (IL); Rafael Carmon, Rishon-Lezion (IL)

(73) Assignee: Broadcom Corporation, Irvine, CA (US)

( * ) Notice: Subject to any disclaimer, the term of this patent is extended or adjusted under 35 U.S.C. 154(b) by 237 days.

(21) Appl. No.: 13/248,829

(22) Filed: Sep. 29, 2011

(65) Prior Publication Data

US 2012/0252491 A1 Oct. 4, 2012

(30) Foreign Application Priority Data

Oct. 25, 2010 (GB) .................................. 1017945.5

(51) Int. Cl.
*H04W 40/00* (2009.01)
(52) U.S. Cl.
USPC ...................... 455/456.2; 455/456.5; 455/502
(58) Field of Classification Search
USPC .............. 455/456.1–456.3, 456.5, 456.6, 502
See application file for complete search history.

(56) References Cited

U.S. PATENT DOCUMENTS

| 6,539,229 | B1 | 3/2003 | Ali | |
|---|---|---|---|---|
| 7,751,833 | B2* | 7/2010 | Mansour et al. | 455/456.2 |
| 2002/0086682 | A1* | 7/2002 | Naghian | 455/456 |
| 2008/0261614 | A1* | 10/2008 | Mia et al. | 455/456.1 |
| 2008/0293435 | A1 | 11/2008 | Maher et al. | |
| 2009/0131073 | A1* | 5/2009 | Carlson et al. | 455/456.1 |

FOREIGN PATENT DOCUMENTS

| GB | 2398963 | 2/2007 |
|---|---|---|
| WO | WO 99/29130 A1 | 6/1999 |

OTHER PUBLICATIONS

Search Report for European Patent Application No. 11008351.6, dated Feb. 28, 2012, 2 pages.
"3rd Generation Partnership Project; Technical Specification Group Radio Access Network; Stage 2 functional specification of User Equipment (UE) positioning in UTRAN (Release 10)", 3GPP Standard: 3 GPP TS 25.305, No. V10.0.0, Oct. 7, 2010, 80 pages.
"Call Flow to Support U-TDOA", TruePosition, 3GPP TSG-RAN WG3 #60 bis, Xi'an, China, Oct. 2010, 6 pages.
Combined Search and Examination Report for Application No. GB1017945.5, dated Mar. 9, 2011, 2 pages.

* cited by examiner

Primary Examiner — Temica M Beamer
(74) Attorney, Agent, or Firm — Sterne, Kessler, Goldstein & Fox PLLC

(57) ABSTRACT

Passive location determining of a 3G handset is provided. The method may include the following steps: sending a sequence of 3G 'Pings' directed at a specified handset over a 3G network; determining the specified handset user identifier and the sewing base station of the specified handset based on reoccurrences of user identifiers responsive of the ping requests, captured from the forward access channel (FACH) of each base station; decoding the FACH of the serving base station responsive to an additional ping, yielding parameters required for receiving uplink dedicated channel (UL DCH); estimating, in each location associated with a base station, a time difference between fastest possible and actual arrival of a signal over the UL DCH sent by the specified handset, wherein the estimating is synchronized to the serving base station; and calculating the location of the specified handset, based on the estimated time differences associated with the locations.

20 Claims, 4 Drawing Sheets

PASSIVE LOCATING OF UMTS HANDSETS

CROSS REFERENCE TO RELATED APPLICATIONS

This application claims the benefit of UK Patent Application Number GB1017945.5, filed on Oct. 25, 2010, which is incorporated by reference herein in its entirety.

BACKGROUND

1. Technical Field

The present invention relates to the field of location identification, and more particularly, to identifying a location of user equipment within a cellular network.

2. Discussion of Related Art

Existing methods of computing the physical location of handsets (user equipments) in cellular communication networks are known in 2G/GSM and include, for example, A-GPS and U-TDOA. U-TDOA, or Uplink Time Difference of Arrival, is a real time locating technology for mobile phone networks that uses multilateration based on timing of received signals to locate a mobile phone. Assisted GPS, generally abbreviated as A-GPS, is a system which can improve the startup performance of a GPS satellite-based positioning system. It is used extensively with GPS-capable cellular phones.

BRIEF SUMMARY

According to one aspect of the invention, a method of determining a physical location of a UMTS 3G handset is provided. The method may include the following steps: comprising: sending a sequence of 3G 'Pings' directed at a specified handset over a 3G network; determining the serving base station of the specified handset (usually the closest) based on reoccurrences of user identifiers responsive of the ping requests, captured from the forward access channel (FACH) of each base station; decoding the FACH of the serving base station responsive to an additional ping, yielding parameters required for receiving uplink dedicated channel (UL DCH); estimating, in each location associated with a base station, a time difference between fastest and actual arrival of a signal over the UL DCH sent by the specified handset, wherein the estimating is synchronized to the serving base station; and calculating the location of the specified handset, based on the estimated time differences associated with the locations.

According to another aspect of the invention, a system for determining a physical location of a UMTS 3G handset is provided. The system may include a location manager (LM) and a plurality of location measurement units (LMU), wherein the LM is in communication with a 3G cellular communication network comprising bases stations and handsets, wherein each LMU is located in proximity, more or less dense to respective base station, wherein the LM is configured to send a sequence of 3G ping requests directed at a specified handset over the cellular communication network, wherein each LMU is configured to detect reoccurrences of user identifiers sent over respective forward access channel (FACH) associated with the specified handset and send back to the LM, a number of the re-occurrences, on a communication channel other than the cellular communication network, wherein the LM is further configured to determine the serving base station on which the handset is camped (usually it is the closest base station being a base station physically closer to the specified handset than any other base station) base on the number of reoccurrences from each LMU, wherein the LMU associated with the serving base station is configured to decode the FACH of the serving base station in response to an additional ping request initiated by the LM and directed at the specified handset, to yield parameters required for receiving an uplink dedicated channel (UL DCH) from the specified handset, wherein the LM is further configured to time synchronize all LMUs according to the LMU associated with the serving base station, wherein the LMUs are configured to each estimate a time difference between the synchronized LMUs time boundaries and actual arrival of a signal (i.e., the time difference between the fastest possible and actual arrival of a signal) sent over the UL DCH by the specified handset, wherein the estimating is synchronized to the serving base station, and wherein the LM is further configured to calculate a physical location of the specified handset based on the estimated time differences sent by the LMUs.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
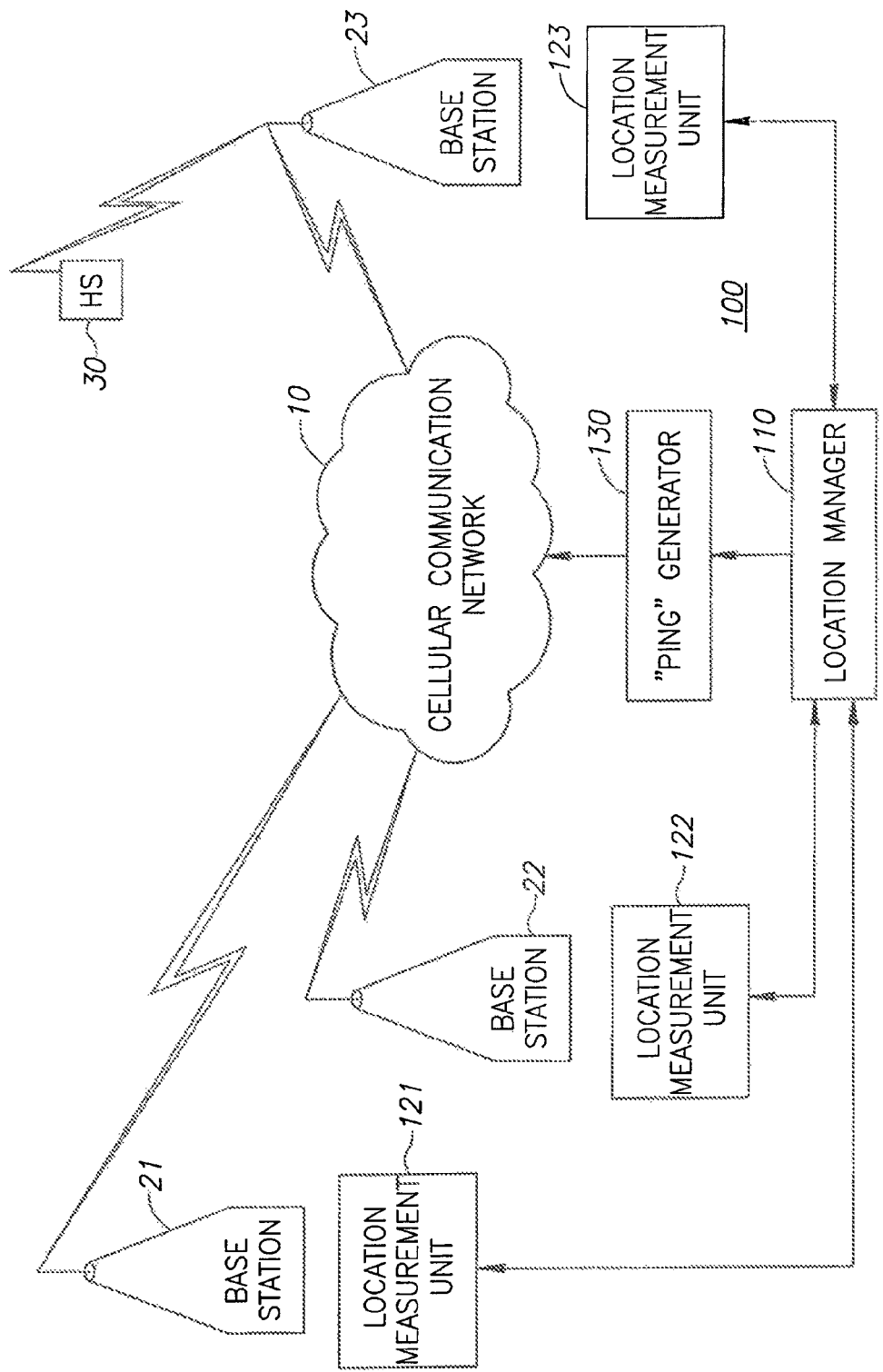
FIG. 1 is a high level schematic block diagram of a system according to some embodiments of the invention.

Prior to setting forth the detailed description, it may be helpful to set forth definitions of certain terms that will be used hereinafter.

The term "Universal Mobile Telecommunication System" commonly abbreviated to "UMTS" as used herein in this application refers to the third-generation (3G) mobile telecommunications technologies, which is also being developed into a 4G technology. The most common form of UMTS uses W-CDMA (IMT Direct Spread) as the underlying air interface but the system also covers TD-CDMA and TD-SCDMA. Being a complete network system, UMTS also covers the radio access network and the core network (Mobile Application Part, or MAP), as well as authentication of users via USIM cards (Subscriber Identity Module).

The term "Ping" or "Ping request as used herein in this application in the context of cellular communication networks refers to a cellular communication network administration utility used by a cellular communication operator to test whether a specified handset (user equipment) is reachable across the network. In return, the handset sends a user identifier.

The term "Forward Access Channel" commonly abbreviated to "FACH" as used herein in this application refers to A UMTS transport channel that forms the downlink half of a transport channel pair known as the RACH (Random Access Channel)/FACH (Forward Access Channel) combination. It is used for downlink signalling and small quantities of data.

The term "Random Access Channel" commonly abbreviated to "RACH" as used herein in this application refers to a shared channel that is used by wireless access terminals to access the access network, especially for initial access and bursty data transmission. A key feature of a Random Access Channel is that messages are not scheduled (compared to for example a "Dedicated Channel" in UMTS, that is assigned exclusively to one user at a time).

The term "Up Link Dedicated Channel" commonly abbreviated to "UL DCH" as used herein in this application refers to A UMTS logical channel allocated to an individual user (Handset) and typically used for dedicated traffic data communication.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram of a system according to some embodiments of the invention. System 100 may be deployed within a cellular communication network 10 that includes base stations such as 21-23 and handsets such as 30 (cellular communication devices, also referred to as user equipments). For the sake of simplicity only one handset 30 is shown. System 100 may include a location manager (LM) 110 and a plurality of location measurement units (LMU) 121-123, such that LM 110 is in communication with a 3G cellular communication network 10 via a 3G 'Ping' generator 130, and wherein each LMU of 121-123 is located in proximity to a respective base station 21-23. LM 110 and LMUs 121-123 are connected to each other by an independent communication channel. (i.e.—a communication channel other than cellular communication network 10).

In operation, LM 110 is configured to send a sequence of 3G ping requests using 'Ping' generator 130, directed at a specified handset 30 over cellular communication network 10. Each LMU 121-123 is instructed by LM 110 to monitor all FAQ-MACH procedures with its respective base station 21-23 so that it detects reoccurrences of all use identifiers sent over respective base stations' forward access channel (FACH) associated among others with specified handset 30. Each LMU 121-123 then sends back to LM 100, the number of the reoccurrences, again, on a communication channel other than cellular communication network 10.

Then, LM 110 determines the handset 30 user identifier and its serving base station (as shown in the figure, base station 23) being a base station physically serving handset 30, based on the max number of reoccurrences from each LMU. Then, LMU 123 which is associated with the serving base station 23 is configured to decode the FACH of the serving base station 23 in response to an additional ping request initiated by LM 110 and directed at specified handset 30, to yield parameters required for receiving an uplink dedicated channel (UL DCH) from specified handset 30.

LM 110 then synchronizes all remaining LMUs 121 and 122 according to LMU 123 such that synchronization is according to the timing schedule of serving base station 23.

Then, the LMUs 121-123 are configured to estimate a time difference between fastest possible and actual arrival of a signal sent over the UL DCH by the specified handset, wherein the estimating is synchronized, as explained above, according to the serving base station. Finally, LM 110 is further configured to calculate a physical location of the specified handset based on the estimated time differences sent by the different LMUs.

Figure 2:
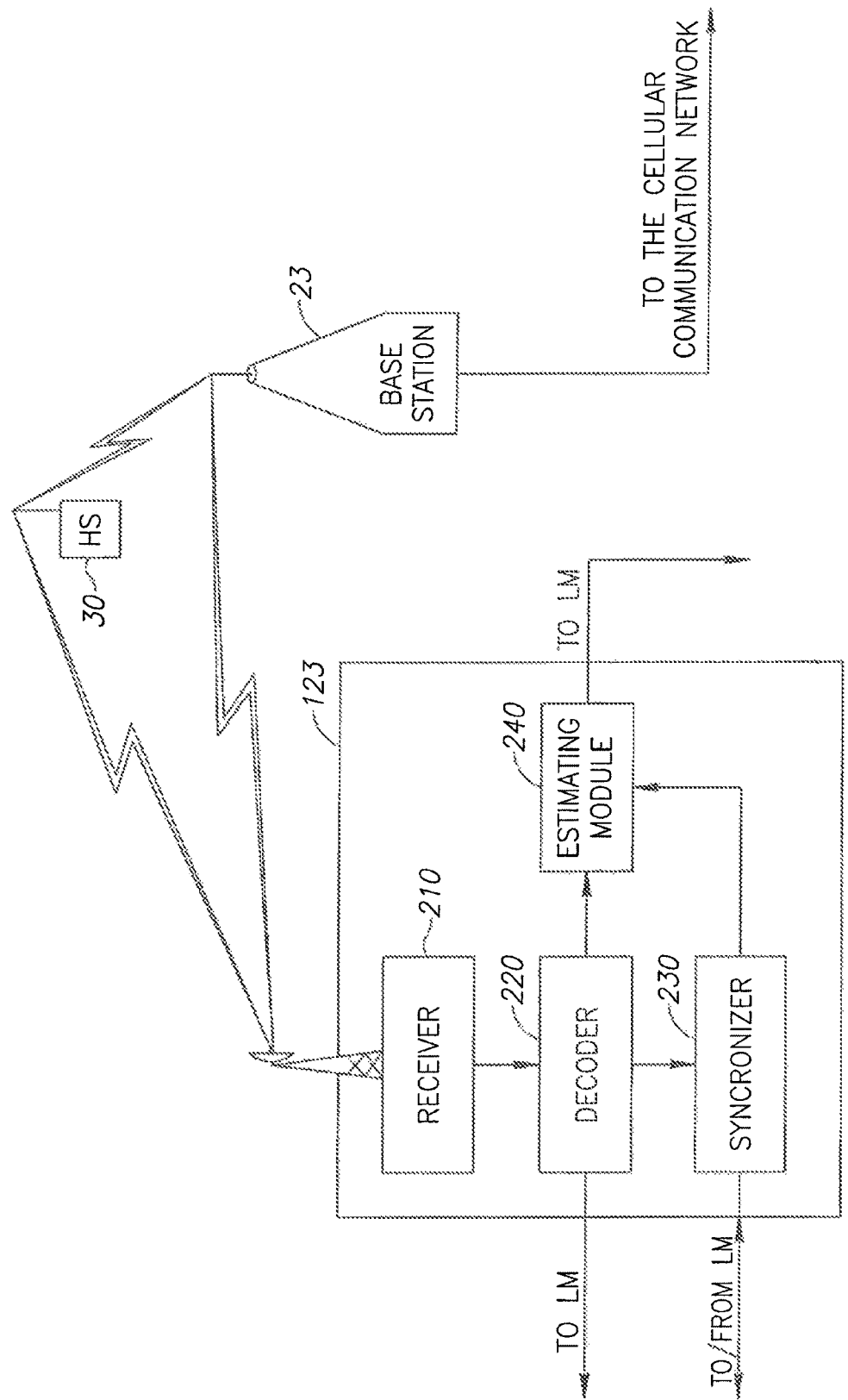
FIG. 2 is a high level schematic block diagram illustration an aspect according to some embodiments of the invention.

FIG. 2 is a high level schematic block diagram illustration in more details, an aspect according to some embodiments of the invention. LMU 123 is shown may include a receiver 210, a decoder 220, a synchronizer 230, and an estimating module 240. LMU 123 may receive signals transmitted by base station 23 as well a signal transmitted by specified handset 30. It is understood however, that LMU 123 (a well as all other LMUs) operate seamlessly to the base stations and the handsets of cellular communication network and is absolutely passive and non-intervening.

In operation, receiver 210 receives the reoccurrences of user identifiers sent over the forward access channel (FACH) responsive of the ping requests by LM 110. After LM 110 determines the target handset user identified and the LMU which is associated with the serving base station (in this case 23), synchronizer 230 synchronizes all other LMUs 121 and 122 according to the timing scheme of base station 23. Specifically, LMU 123 becomes a master whereas LMU 121 and 122 become slaves. Then, decoder 220 decodes the FACH of base station 23 in response to an additional ping request directed at the specified handset, to yield parameters required for receiving an uplink dedicated channel (UL DCH). These parameters are sent immediately, via LM 110 to the rest of the LMUs.

Then, estimating module 240, in each LMU associated with a base station, estimates a time difference between fastest possible and actual arrival of a signal over the UL DCH sent by specified handset 30, wherein the estimating is synchronized as explained above to the serving base station 23. These estimations are sent by each LMU to LM 110 for calculating of the physical location of specified handset 30, based on the estimations from each location of respective LMU.

Consistent with one embodiment of the invention, the communication between the LM and the LMUs is independent of the cellular communication network and based on Internet Protocol (IP) communication.

Consistent with one embodiment of the invention, the LMUs are synchronized based on Global Positioning System (GPS) or Internet Protocol (IP) timing.

Consistent with one embodiment of the invention, the 3G ping requests are in a form of a silent SMS.

Consistent with one embodiment of the invention, the parameters decoded by the LMU associated with the serving base station comprise at least one of: UL scrambling code, activation time, frame and chips offsets.

Consistent with one embodiment of the invention, the synchronization according to the LMU associated with the serving base station is associated with at least one of: chip, slot and frame level of the serving base station.

Consistent with one embodiment of the invention, wherein the user identifier is a Temporary Mobile Subscriber Identity (TMSI) or IMSI.

Figure 3:
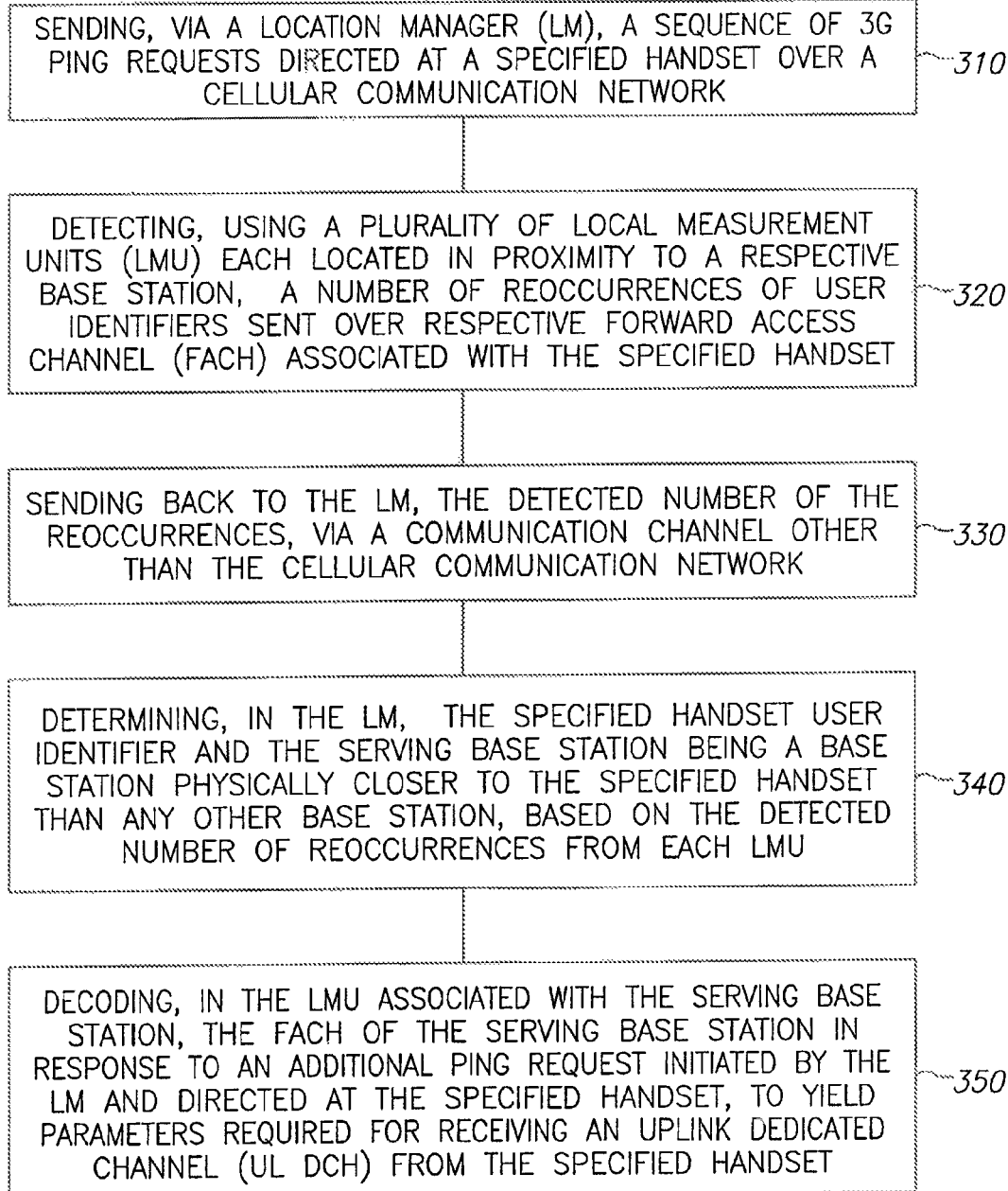
FIG. 3 is a high level flowchart illustrating a method according to some embodiments of the invention.
Figure 3:
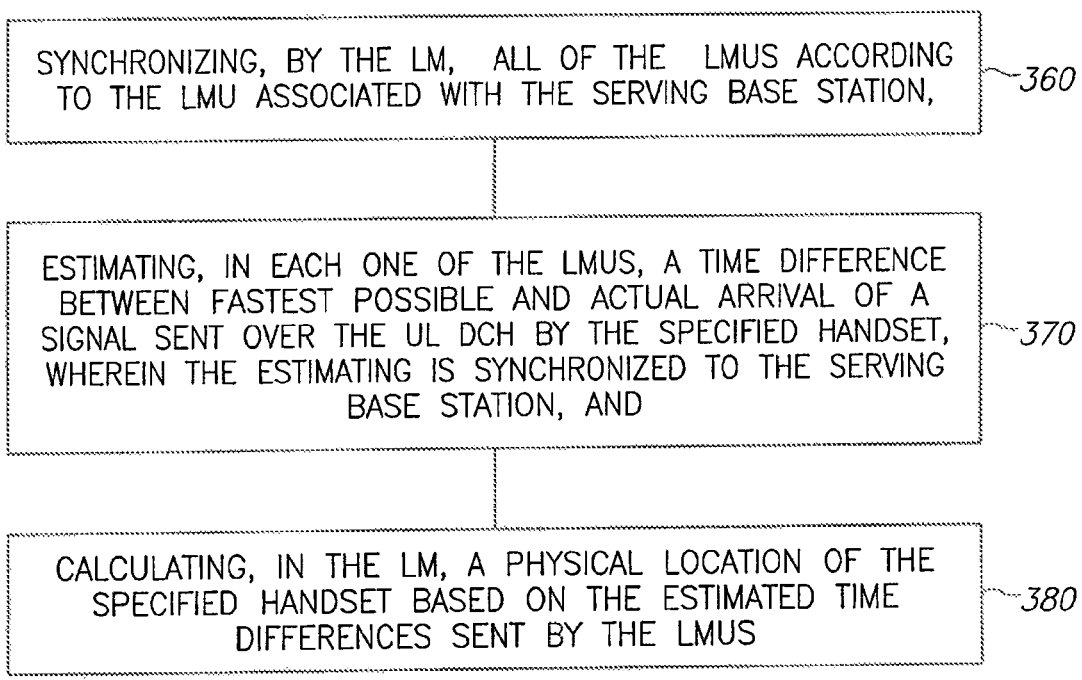

FIG. 3 is a high level flowchart illustrating a method 300 according to some embodiments of the invention. Although method 300 is not necessarily bound to the aforementioned architecture of system 100, the stages of method 300 are described below in conjunction with some of the elements of system 100.

Method 300 may start with the step of sending, via a location manager 110 (LM), a sequence of 3G ping requests directed at a specified handset 30 over a cellular communication network 10. The method then goes on to the step of detecting, using a plurality of local measurement units 121-123 (LMU) each located in proximity to a respective base station, a number of reoccurrences of user identifiers sent over respective forward access channel (FACH) associated with the specified handset 30. The method proceeds to the step of sending back to the LM 110, the detected number of the reoccurrences, via a communication channel other than the cellular communication network. Then the method goes on to the step of determining, in the LM 110, the specified handset user identifier and the serving base station 23 being a base station physically closer to the specified handset 30 than any other base station, based on the detected number of reoccurrences from each LMU 121-123. The method goes on to the step of decoding, in the LMU 123 associated with the serving base station 23 the FACH of the serving base station in response to an additional ping request initiated by the LM 110 and directed at the specified handset 30, to yield parameters required for receiving an uplink dedicated channel (UL DCH) from the specified handset 30. The method then proceeds to the step of synchronizing, by the LM 110, all of the LMUs 121-122 according to the LMU 123 associated with the serving base station 23. The method then goes on to the step of estimating, in each one of the LMUs 121-123, a time difference between fastest possible and actual arrival of a signal sent over the UL DCH by the specified handset 30, wherein the estimating is synchronized to the serving base station 23. Then finally, the method goes on to the step of calculating, in the LM 110, a physical location of the specified handset 30 based on the estimated time differences sent by the LMUs 121-123.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program, products according to various embodiments of the present invention. In this regard, each portion in the flowchart or portion diagrams may represent a module segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component feature, structure, or characteristic "may", "might", "can" or "could" be included, that particular component, feature, structure, or characteristic is not required to be included.

Where applicable although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. A system, comprising:
   a location manager configured to:
      initiate a transmission of a request for a user identifier of a communications device, and
      determine, based on information regarding a number of transmissions of the user identifier, a serving base station for the communications device; and
   a plurality of location measurement units (LMUs) in communication with each other and the location manager, wherein the plurality of LMUs are configured to:
      detect one or more transmissions of the user identifier from a base station in proximity to one or more LMUs in the luralit of LMUs, and
      send the information regarding the number of the transmissions of the user identifier to the location manager.

2. The system of claim 1, wherein the communications device is configured to transmit the user identifier to the base station responsive to receiving the request.

3. The system of claim 1, wherein the location manager is further configured to determine that the serving base station is a particular base station in proximity to a particular LMU that sent a highest number of transmissions of the user identifier.

4. The system of claim 1, wherein each LMU in the plurality of LMUs is further configured to monitor forward channel procedures or random access channel procedures to detect the transmissions.

5. The system of claim 4, wherein an LMU, in the plurality of LMUs, that is in proximity to the serving base station is further configured to:

receive an additional request initiated by the location manager; and determine a parameter for receiving an uplink channel from the communications device by decoding a forward channel of the serving base station.

6. The system of claim 5, wherein the location manager is further configured to synchronize other LMUs in the plurality of LMUs according to a timing schedule of the LMU in proximity to the serving base station.

7. The system of claim 6, wherein each LMU in the plurality of LMUs is further configured to estimate a time difference between a possible arrival of a signal sent over the uplink channel by the communications device and an actual arrival of the signal sent over the uplink channel by the communications device.

8. The system of claim 7, wherein the LMU in proximity to the serving base station is further configured to calculate a physical location of the communications device based on the estimated time difference.

9. A location measurement unit (LMU) in proximity to a base station, the LMU comprising:
a receiver configured to receive transmissions of a user identifier in proximity to a communications device;
a synchronizer configured to synchronize the LMU according to a timing scheme of the base station;
a decoder configured to decode a forward channel of the base station to determine a parameter for receiving an uplink channel from the communications device; and
an estimation module configured to:
estimate a time difference between a possible arrival of a signal sent over the uplink channel by the communications device and an actual arrival of the signal sent over the uplink channel by the communications device, and
send information regarding the estimated time difference and a number of the transmissions of the user identifier to a location manager (LM).

10. The LMU of claim 9, wherein the synchronizer is further configured to synchronize other LMUs according to the timing scheme of the base station.

11. The LMU of claim 9, wherein the synchronizer is further configured to receive information from the location manager designating the LMU as a master.

12. The LMU of claim 11, wherein the synchronizer is further configured to synchronize other LMUs according to the timing scheme of the base station responsive to receiving the information from the location manager designating the LMU as the master.

13. The LMU of claim 9, wherein the receiver is further configured to monitor forward channel procedures or random access channel procedures with the base station to receive the transmissions.

14. A method, comprising:
initiating transmission of a request for a user identifier of a communications device;
receiving information regarding a number of transmissions of the user identifier from a plurality of location measurement units (LMUs) proximate to a plurality of base stations; and
determining, based on the information, a serving base station serving the communications device.

15. The method of claim 14, further comprising:
synchronizing the plurality of LMUs according to a serving LMU proximate to the serving base station.

16. The method of claim 14, further comprising:
calculating a physical location of the communications device based on estimated time differences sent by the plurality of LMUs.

17. The method of claim 16, wherein each estimated time difference sent by each LMU in the plurality of LMUs is an estimated time difference between a possible arrival of a signal sent over an uplink channel by the communications device and an actual arrival of the signal sent over the uplink channel by the communications device.

18. The method of claim 17, further comprising:
initiating a transmission of an additional request to the communications device, wherein the plurality of LMUs determine parameters for receiving the uplink channel from the communications device responsive to receiving the additional request.

19. The LMU of claim 9, wherein the timing scheme is a global positioning satellite (GPS) timing scheme.

20. The LMU of claim 9, wherein the receiver is configured to receive the transmissions of the user identifier responsive to a ping request by the LM.

* * * * *

UNITED STATES PATENT AND TRADEMARK OFFICE
CERTIFICATE OF CORRECTION

Page 1 of 1

PATENT NO. : 8,781,497 B2
APPLICATION NO. : 13/248829
DATED : July 15, 2014
INVENTOR(S) : Degtyar et al.

It is certified that error appears in the above-identified patent and that said Letters Patent is hereby corrected as shown below:

In the Claims

Column 8, line 51, claim 1, delete "luralit" and insert -- plurality --.

Signed and Sealed this
Seventh Day of April, 2015

Michelle K. Lee
*Director of the United States Patent and Trademark Office*